(12) United States Patent
Maniccia et al.

(10) Patent No.: US 7,297,317 B2
(45) Date of Patent: Nov. 20, 2007

(54) PROCESS FOR PRODUCING BORON NITRIDE

(75) Inventors: Laurence Maniccia, Lyndhurst, OH (US); Donald William Pultz, Jr., Parma, OH (US)

(73) Assignee: Momentive Performance Materials Inc., Wilton, CT (US)

( * ) Notice: Subject to any disclaimer, the term of this patent is extended or adjusted under 35 U.S.C. 154(b) by 68 days.

(21) Appl. No.: 11/266,634

(22) Filed: Nov. 3, 2005

(65) Prior Publication Data

US 2006/0140839 A1    Jun. 29, 2006

Related U.S. Application Data

(60) Provisional application No. 60/639,716, filed on Dec. 28, 2004.

(51) Int. Cl.
*C01B 21/064* (2006.01)

(52) U.S. Cl. ..................................................... 423/290

(58) Field of Classification Search ................ 423/290
See application file for complete search history.

(56) References Cited

U.S. PATENT DOCUMENTS

| | | | |
|---|---|---|---|
| 2,922,699 A | 1/1960 | Lauzau | |
| 3,189,412 A | 6/1965 | Wood et al. | |
| 3,241,918 A | 3/1966 | Lenihan et al. | |
| 3,261,667 A | 7/1966 | O'Connor | |
| 4,107,276 A | 8/1978 | Schwetz et al. | |
| 4,971,779 A * | 11/1990 | Paine et al. | 423/290 |
| 5,854,155 A * | 12/1998 | Kawasaki et al. | 501/96.4 |
| 6,348,179 B1 * | 2/2002 | Paine et al. | 423/277 |
| 6,824,753 B2 * | 11/2004 | Paine et al. | 423/277 |
| 7,060,237 B1 * | 6/2006 | Paine et al. | 423/277 |

FOREIGN PATENT DOCUMENTS

| | | |
|---|---|---|
| GB | 874165 | 8/1961 |
| GB | 874166 | 8/1961 |
| GB | 1241206 | 8/1961 |
| JP | 58-41706 | 3/1983 |
| WO | WO0248026 A2 | 6/2002 |

* cited by examiner

*Primary Examiner*—Wayne A. Langel
(74) *Attorney, Agent, or Firm*—Dominick G. Vicari

(57) ABSTRACT

A process for producing boron nitride using a boron containing ore as a starting material, by reacting naturally occurring ulexite with ammonia at high temperature, for a boron nitride with high impurity and at a high yield.

20 Claims, No Drawings

PROCESS FOR PRODUCING BORON NITRIDE

CROSS-REFERENCE TO RELATED APPLICATIONS

This application claims the benefits of U.S. 60/639,716 filed Dec. 28, 2004, which patent application is fully incorporated herein by reference.

FIELD OF THE INVENTION

The invention relates generally to a process for producing boron nitride using a borate mineral ore such as ulexite as a reactant material, and a boron nitride product thereof.

BACKGROUND OF THE INVENTION

Boron nitride ("BN") is a thermally stable, highly refractory material of increasing commercial significance. Typically, boron nitride is produced by processes wherein boric acid is utilized as the boron source of reaction compositions. Suggested processes for producing boron nitride from boric acid are described in U.S. Pat. Nos. 2,922,699; 3,241,918; and 3,261,667 as well as in British Pat. Nos. 874,166; 874,165; and 1,241,206. U.S. Pat. No. 3,189,412 discloses a process to prepare boron nitride by passing nitrogen or ammonia or other nitrogen providing gas at 1200 to 1600° C. over a mixture comprising boric oxide, boric acid, or another boric oxide providing substance, carbon, and a catalyst, treating the reaction mixture with dilute mineral acid, and separating the boron nitride. JP Patent Publication No. 06-040713 discloses a process for producing boron nitride from colemanite, which is a hydrated calcium borate compound. It is thought that sodium compounds such as sodium borate can promote grain growth for BN particles in addition to the grain growth resulting from calcium borate compounds.

Applicants have discovered a process to use ulexite, a hydrated sodium calcium borate compound, in the direct manufacture of boron nitride instead of or in addition to boric acid as a reactant material. Using ulexite as a reactant in the boron nitride making process inherently enhances the grain growth of boron nitride, since ulexite contains sodium borate, providing an improved and economical process for making boron nitride of high purity and excellent yield.

SUMMARY OF THE INVENTION

The invention relates to a process for producing a polycrystalline hexagonal boron nitride compound by reacting ulexite with ammonia for at least one hour at a processing temperature of at least 1000° C.

DESCRIPTION OF THE INVENTION

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

The term "processing temperature" may be used interchangeable with the term "process temperature," refers to the temperature in the equipment/step in the process for making hBN in the invention.

Generally in processes to produce boron nitride, a boron source and a nitrogen source are reacted to form a compound in which a boron atom and a nitrogen atom coexist. Instead of using boric acid as a boron source in the process of manufacturing boron nitride, applicants have discovered the use of ulexite as the boron source for excellent yields of high-purity, highly-crystalline hexagonal boron nitride.

Starting Raw Materials: In one embodiment of the invention, the starting boron material comprises of ulexite. Ulexite is a hydrated sodium calcium borate of the formula $(Na_2O)_{0.2}(CaO)_{0.5}(B_2O_3)_{0.16}H_2O$, and it also contains magnesium, silica, aluminum, and iron impurities. As opposed to boric acid, ulexite is not soluble in water. Ulexite, also called "TV rock," has a unique optical property is that is transmits light along the long axis of the crystal by internal reflections, very much in the same way as in fiber optics.

In one embodiment, in addition to ulexite as the starting boron material, optionally up to 35 wt. % boric acid may be added as the boron source. In another embodiment, up to 50 wt. % boric acid may be added as the boron source. In yet another embodiment, alkaline earth metal salts of boric acid can be used instead of boric acid.

In one embodiment of the invention, the nitrogen-containing compound comprises organic primary, secondary, and tertiary amines such as diphenylamine, dicyandiamide, ethylene amine, hexamethylene amine, melamine, urea, and mixtures thereof. In one embodiment, melamine is used as the nitrogen-containing compound. In a second embodiment, dicyandiamide is used as a nitrogen containing promoter. In a third embodiment, the nitrogen-containing raw material is ammonia for the ulexite boron-containing material to be fired in an ammonia atmosphere.

In one embodiment of the invention, the nitrogen-containing compound in a powder form may be added to the ulexite-containing starting boron material in a ratio of about 30 to 55 wt. % of nitrogen-containing compound to starting boron material. In a second embodiment, the ratio of nitrogen-containing compound to starting boron material is about 40 to 50 wt. %. In a third embodiment, the ratio is about 30 to 55 wt. %.

Process Steps: The process for making hBN of the invention may be carried out as a batch process, or as a continuous process, including the following process steps.

Optional mixing/blending. In the initial step, the starting materials including the dopant are mixed or otherwise blended together in a dry state in suitable equipment such as a blender. The starting materials are used in powdery or compact form, whereby the grain size is not critical. If the starting materials comprise more than just ulexite (i.e., optional boric acid, optional nitrogen-containing promoters), the starting mixture is mixed in the dry state.

Optional pre-heating/drying step After the optional mixing/blending step, the starting material is dried at temperatures of about 100 to 400° C., and in one embodiment, from 150 to 250° C., to drive off any moisture in the reactants and create porosity between the raw materials, forming aggregates of materials in the form of nuggets, chunks, or pellets.

The drying operation can be carried out in air, or in a nitrogen or ammonia atmosphere. The drying time depends on the drying temperature and also whether the drying step is performed in a static atmosphere, or with circulating air or gas. In one embodiment, the drying time ranges from 4 hours at 200° C. to about 10 hours at 150° C. in a static environment. In a second embodiment, the drying time ranges from 1 to 15 hours.

Optional Crushing of the Precursors: After the drying step, the starting material is crushed or ground using conventional milling equipment such as roller mills, cross beater mills, rolling discs, and the like. In one embodiment, the crushed materials are broken into pieces weighing between 10 mg to 10 g each. In yet another embodiment, the materials are broken into pieces weighing about 0.2 g each.

Optionally in the next step, the crushed material is mixed with silica wherein the calcium in the ulexite reacts with the silica to give rise to calcium silicate to prevent the formation of $3CaO.B_2O_3$ which may otherwise be formed, thus giving a high yield of BN in the final reaction. In one embodiment, the total amount of silica to ulexite is maintained at a molar ratio of $SiO_2/CaO$ of less than 0.5. In a second embodiment, the molar ratio is maintained at a rate of less than 1.0.

Optional Combined Preheating and Densification ("Pilling") Step: In one embodiment after the mixing/blending step, the mixed precursors are dried/crushed, and then densified using a process known in the art such as tableting, briquetting, extruding, pilling, and compacting, among others. In this step, the crushed mixture is densified into pellets weighing from 0.1 g to 200 g each. In one embodiment, the pellets have an average weight of ~10 g. in a second embodiment, the crushed mixture is densified into pellets with an average weight of about 2 g.

In one embodiment, the densification/pelletizing steps are carried out in one extruding step, wherein the raw materials including ulexite and optional silica are fed in a twin screw extruder or similar equipment with a binder, such as polyvinyl alcohol; polyoxyethylene-based nonionic surfactants; polycarboxylic acid salts such as acrylic acid, methacrylic acid, itaconic acid, boletic acid, and maleic acid; polyoxazolines such as poly(2-ethyl-2-oxazoline); stearic acid; N,N'-ethylenebissteramide; sorbitan compounds such as sorbitan monostearate; and the like. The material is then subsequently dried and pelletized upon exit from the extruder.

The exit pellets can be fed in a continuous process directly into the reaction vessel for the next step, or in yet another embodiment, processed through a furnace of 200° C. for additional drying prior to being fed into the reaction vessel.

Calcinating Step: After drying and optional mixing with silica, the material is purged in a nitrogenous atmosphere such as ammonia at an elevated temperature of 700 to 1200° C. for an extended period of time of up to 18 hours to form an incompletely reacted boron nitride in the "turbostratic" form. In one embodiment, the material is maintained in ammonia while being fired at 1000 to 1200° C. for 1 to 24 hours. In a second embodiment, the material is fired at 1200° C. for about 4 hours.

Heat Treating/Sintering Step: After calcinations, the turbostratic boron nitride is sintered at a temperature of at least about 1500° C. for at least 10 minutes. In one embodiment, the sintering is for about 1 to about 4 hours. In one embodiment, the heat treatment/sintering is carried out from about 1800° C. to about 2300° C. for 2 to 3 hours. In another embodiment, from 2000° C. to 2300° C. In yet another embodiment, from 2000° C. to about 2100° C. in inert gas, nitrogen, or argon. In one embodiment, the sintering is carried out in a vacuum. In another embodiment, the sintering is carried out under conditions of at least 1 atmosphere of pressure.

Combined Single-step of Calcinating/Sintering: In yet another embodiment and instead of performing a two-step process of calcinations then heat-treating/sintering, the pellets are fired in a nitrogenous atmosphere in a reaction chamber, wherein the chamber is heated up from room temperature at a rate of 20 to 1200° C. per hour to at an elevated temperature of 1200 to 2300° C. The process temperature is then held for about 1 to 30 hours, wherein the nitrogen purge is maintained at a rate sufficient to sustain a non-oxidizing environment. In one embodiment of a single step process, the pellets containing the reactants including ulexite are fired in one single step at an elevated processing temperature forming BN crystals, for a high crystallinity boron nitride product.

In one embodiment, the pellets are maintained in ammonia while being fired to 1200 to 1600° C. for 2 to 12 hours. In a second embodiment, the pellets are fired at 1400° C. for about 4 hours. In a third embodiment, the pellets are fired from room temperature to a temperature of 1800° C. at a rate of 500° C. per hour. The temperature is then held at 1800° C. for 5 hours, wherein a nitrogen purge is maintained.

The single step reaction at high temperature is carried out using high temperature furnace equipment known in the art, for example, a plasma jet furnace. In one embodiment, the nitrogenous atmosphere is a mixture of ammonia and an inert gas.

The process of the invention can be carried out as a batch process or continuously, whereby the reaction mixture is introduced as a loose powder, or as a compacted mass into a reaction vessel, which in one embodiment is made of graphite.

Washing Step. After firing, the reaction product is cooled and the product is subject to a washing treatment. In one embodiment, the washing treatment is via leaching with an HCl solution of 26 vol. % to remove the impurities such as sodium borate and calcium borate, which come from ulexite. In a second embodiment, the leaching is via several cycles of HCl washing at an elevated temperature of at least 60° C., and then deionized water at room temperature.

Applications of the BN Powder Made from the Invention: The high purity boron nitride powder of the present invention can be used as a filler or additives for polymer compositions. In one embodiment, the BN powder is used in thermal management applications, such as in composites, polymers, greases, and fluids. The boron nitride powder can also be used in hot pressing applications, or as a precursor feed stock material in the conversion of hexagonal boron nitride to cubic boron nitride. In another embodiment, the material is used for making a hexagonal boron nitride paste. As used herein, paste is a semisolid preparation. This method involves providing a boron nitride slurry and treating the slurry under conditions effective to produce a boron nitride paste including from about 60 wt. % to about 80 wt. % solid hexagonal boron nitride.

EXAMPLES

The invention is further illustrated by the following non-limiting examples:

Example 1

200 grams of ulexite is placed in a crucible and dehydrated at 200° C. The material is then ground to granules of about 10 mm size. 150 grams of this material is then placed into a graphite tube, and ammonia gas is flowed through the tube. While ammonia gas is supplied at a rate of 0.5 litre/min. through the tube, it is heated to 1400° C. at the rate of 300° C. per minute. The temperature is maintained for 2 hours, and then the supply of ammonia is allowed to stop. The tube is allowed to cool naturally while argon gas is passed through. Powder x-ray diffraction analysis of the product confirms the presence of boron nitride.

The reaction product obtained is then finally ground in a mill, placed in 400 cc of 3N HCl, and the impurities are allowed to be thoroughly leached into the acid. It is then filtered and washed repeatedly with deionized water 6 times. After drying at 80° C. for 24 hours, a white powder is obtained. X-ray diffraction of the powder shows only the presence of BN. The white powder is then weighed, giving greater than 90% of theoretical yield. Content of impurities such as calcium, silicon, and magnesium is insignificant, indicating that the final product is high purity BN.

Example 2

The BN product of Example 1 is further heat-treated or sintered at 1700 to 2100° C. in a non-oxidizing gas atmosphere of nitrogen or argon. This treatment results in the progress of crystallization, yielding a BN product of improved crystallinity and purity.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referred herein are expressly incorporated herein by reference.

The invention claimed is:

1. A process for producing a polycrystalline hexagonal boron nitride compound, which comprises: heating a mixture containing a boron-containing compound comprising ulexite with a nitrogen-containing compound selected from the group consisting of ammonia, organic primary, secondary, and tertiary amines, and mixtures thereof, for at least 10 minutes at a temperature of at least 700° C., under a non-oxidizing atmosphere to form boron nitride.

2. The process of claim 1, wherein the nitrogen-containing compound comprises ammonia.

3. The process of claim 1, wherein the nitrogen-containing compound is present in a ratio of about 30 to 55 wt. % of nitrogen-containing compound to the boron-containing compound.

4. The process of claim 3, wherein the nitrogen-containing compound is present in a ratio of about 40 to 50 wt: % of nitrogen-containing compound to the boron-containing compound.

5. The process of claim 1, wherein the mixture is heated at a temperature ranging from 1000 to 2300° C.

6. The process of claim 1, wherein the mixture is heated for at least ½ hour.

7. The process of claim 6, wherein the mixture is heated for at least 1 hour at a temperature ranging from 1200 to 2300° C.

8. The process of claim 7, wherein the mixture is heated at a temperature ranging from 1000 to 2300° C. for up to 24 hours.

9. The process of claim 1, wherein the boron-containing compound further comprises up to 50 wt. % of boric acid.

10. The process of claim 9, wherein the boron-containing compound further comprises up to 35 wt. % of boric acid.

11. The process of claim 1, wherein the nitrogen-containing compound comprises melamine.

12. A process for producing a polycrystalline hexagonal boron nitride compound, which comprises:
    a) forming a mixture of a boron-containing compound comprising ulexite with a nitrogen-containing compound selected from the group consisting of organic primary, secondary, and tertiary amines, and mixtures thereof;
    b) heating the mixture at a temperature of at least 200° C. for at least ½ hour to dry off any moisture in the mixture;
    c) subjecting the mixture to a processing temperature of at least 1000° C. for up to 24 hours to form a hexagonal boron nitride compound.

13. The process of claim 12, wherein the nitrogen-containing compound is present in a ratio of about 30 to 55 wt. % of nitrogen-containing compound to the boron-containing compound.

14. The process of claim 12, wherein the mixture of boron-containing compound comprising ulexite and nitrogen-containing compound is subject to a processing temperature of about 1800° C. to about 2400° C. for at least 2 hours.

15. The process of claim 12, further comprising the step of sintering the hexagonal boron nitride compound at a temperature of about 1800° C. to about 2400° C. for 2 to 3 hours.

16. The process of claim 12, further comprising the step of washing the hexagonal boron nitride compound in a solution of HCl solution of 26 vol. % at a temperature of at least 50° C. , wherein the resulting hexagonal boron nitride compound contains at least 90 wt. % boron nitride.

17. The process of claim 12, wherein the nitrogen-containing compound comprises melamine.

18. A process for producing a polycrystalline hexagonal boron nitride compound, which comprises:
    a) forming a mixture of a boron-containing compound comprising ulexite with a nitrogen-containing compound selected from the group consisting of organic primary, secondary, and tertiary amines, and mixtures thereof, in a ratio of 35 to 55 wt. % of the nitrogen-containing compound to the boron-containing compound;
    b) heating the mixture at a temperature of at least 200° C. for at least ½ hour to dry off any moisture in the mixture;
    c) subjecting the mixture to a processing temperature of at least 1100° C. for up to 5 hours to form an incompletely reacted boron nitride compound; and
    d) subjecting the incompletely reacted boron nitride compound to a processing temperature of 1200 to 2300° C. for up to 24 hours to form a hexagonal boron nitride compound.

19. The process of claim 18, wherein the boron-containing compound further comprises up to 35 wt. % of boric acid.

20. The process of claim 19, wherein the nitrogen-containing compound comprises melamine.

* * * * *